No. 748,261. PATENTED DEC. 29, 1903.
J. P. CLEAL.
CASH REGISTER.
APPLICATION FILED JUNE 15, 1900.
NO MODEL. 8 SHEETS—SHEET 1.
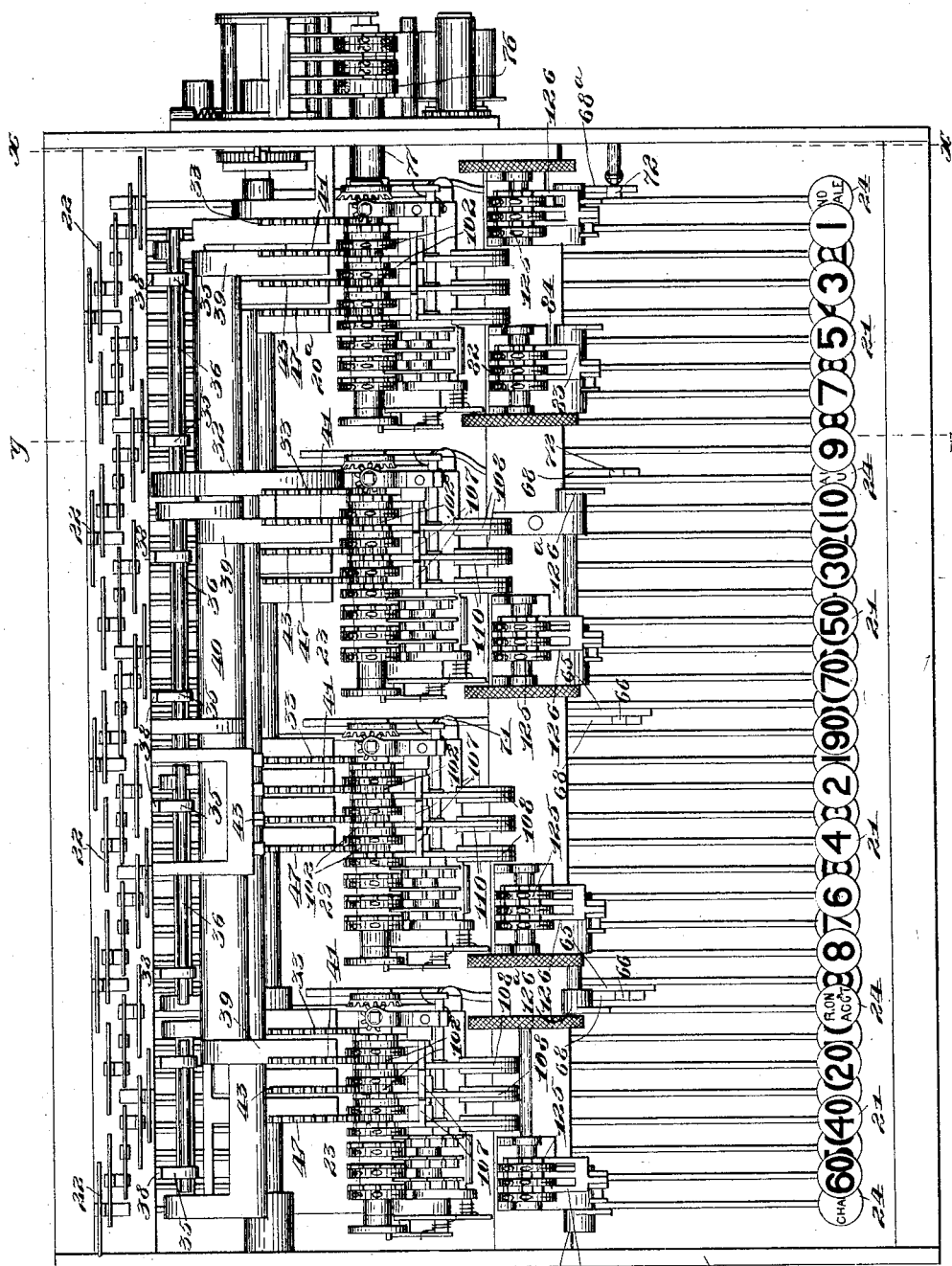

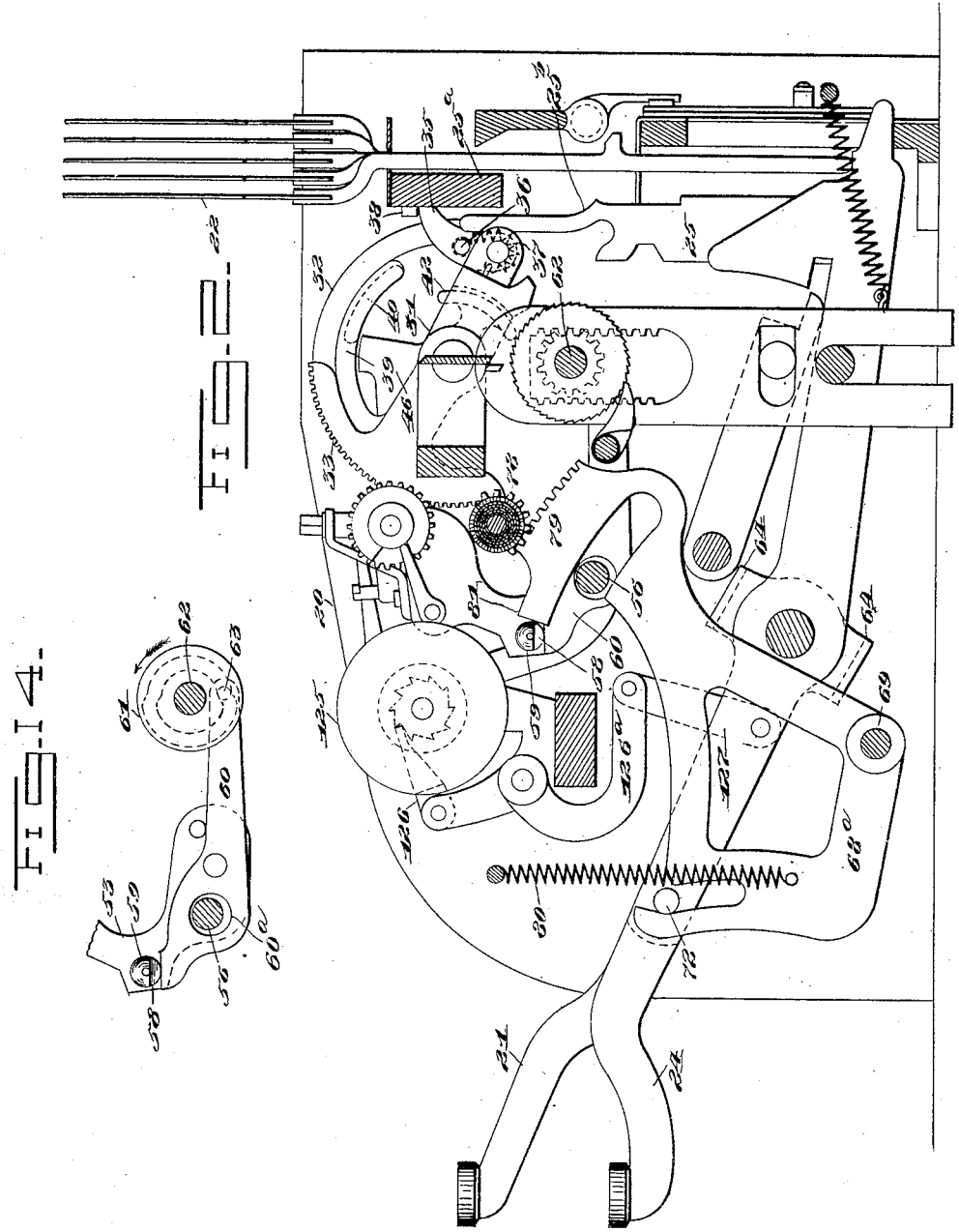

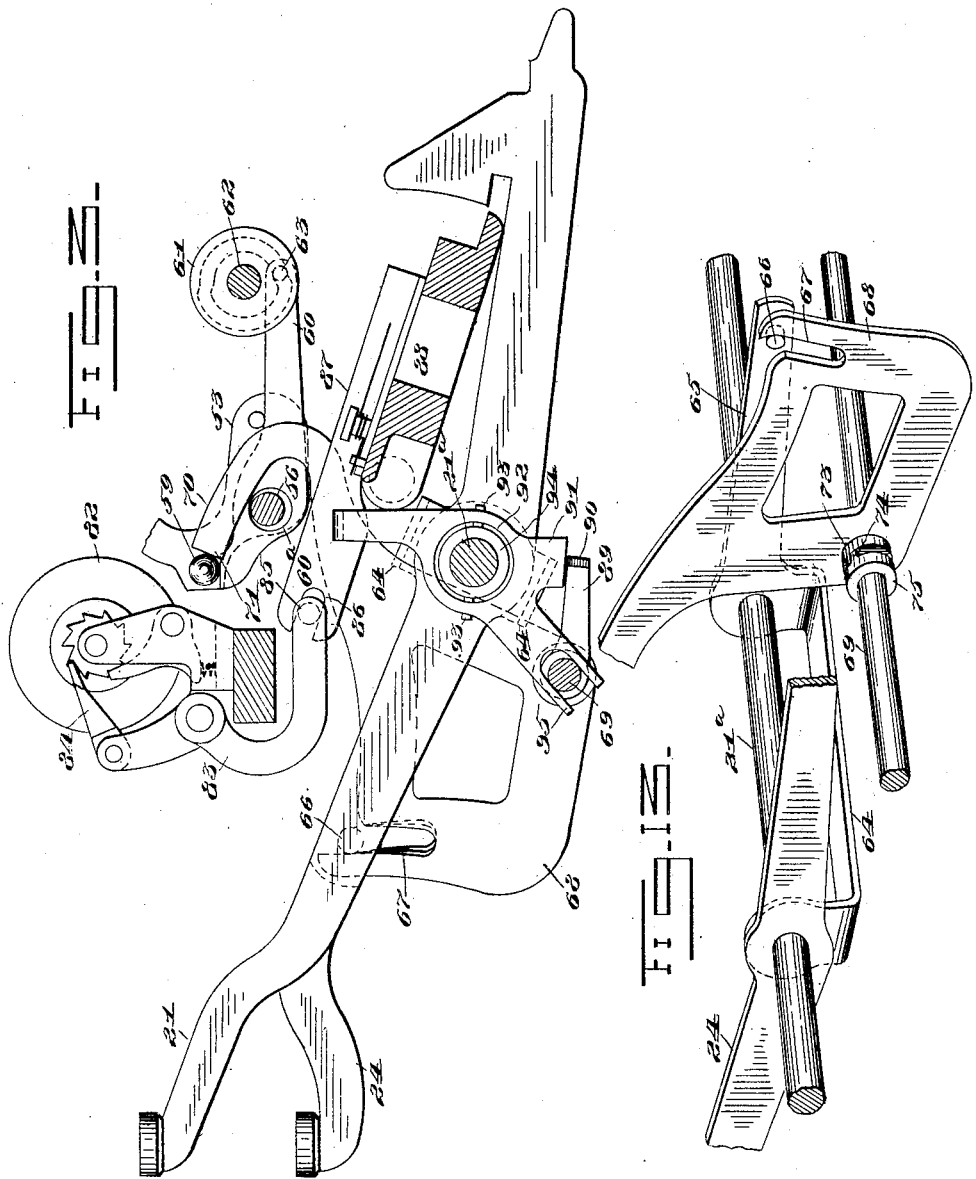

No. 748,261. PATENTED DEC. 29, 1903.
J. P. CLEAL.
CASH REGISTER.
APPLICATION FILED JUNE 15, 1900.
NO MODEL. 8 SHEETS—SHEET 4.
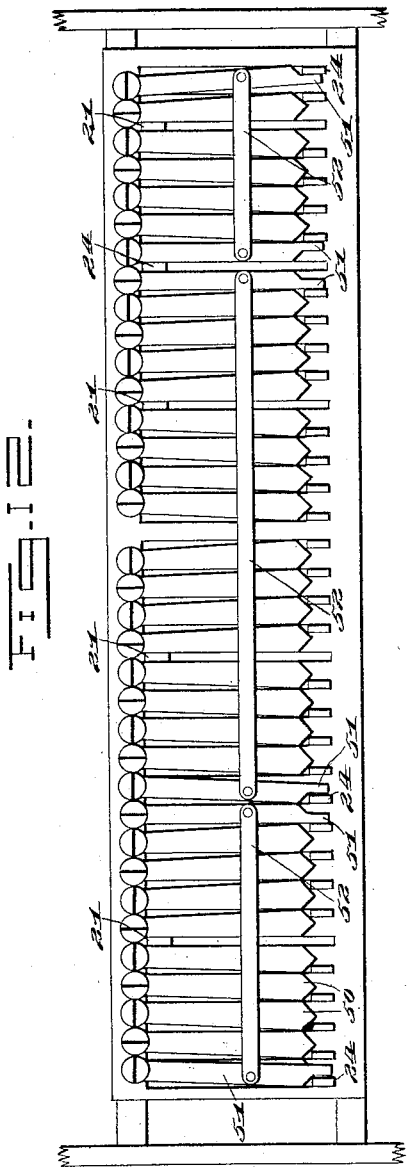
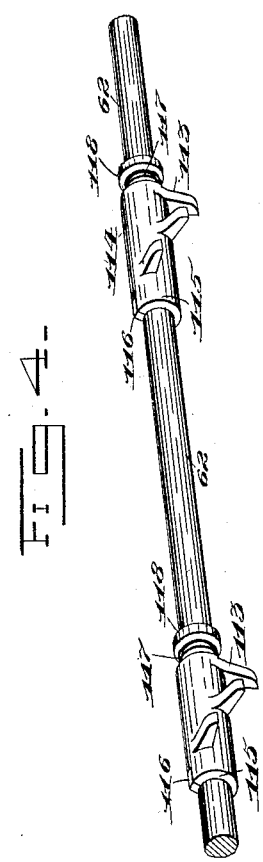
Witnesses
Inventor
Joseph P. Cleal.
By Alvan Macauley.
Attorney No. 748,261. PATENTED DEC. 29, 1903.
J. P. CLEAL.
CASH REGISTER.
APPLICATION FILED JUNE 15, 1900.
NO MODEL. 8 SHEETS—SHEET 5.
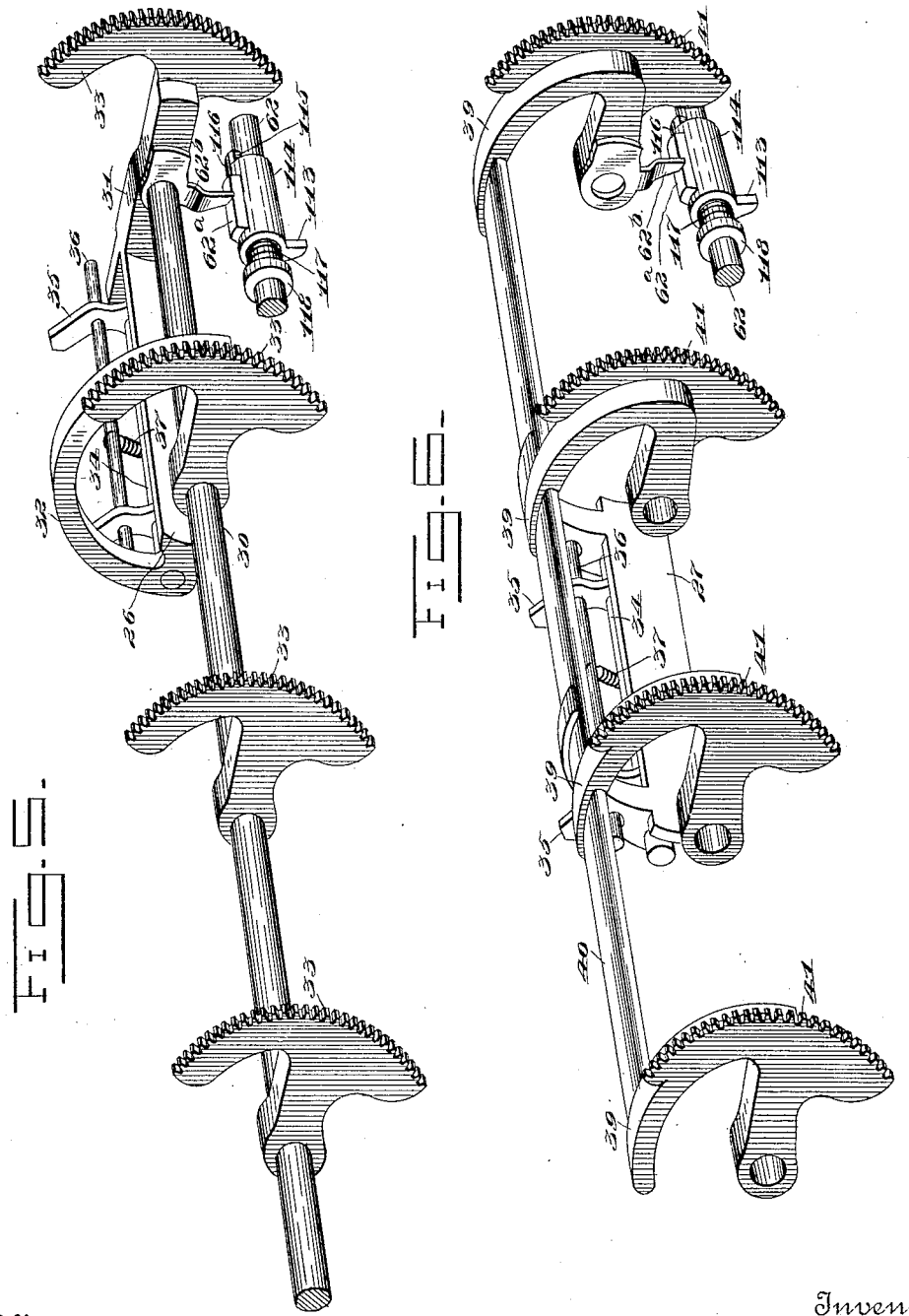

No. 748,261. PATENTED DEC. 29, 1903.
J. P. CLEAL.
CASH REGISTER.
APPLICATION FILED JUNE 15, 1900.
NO MODEL. 8 SHEETS—SHEET 6.
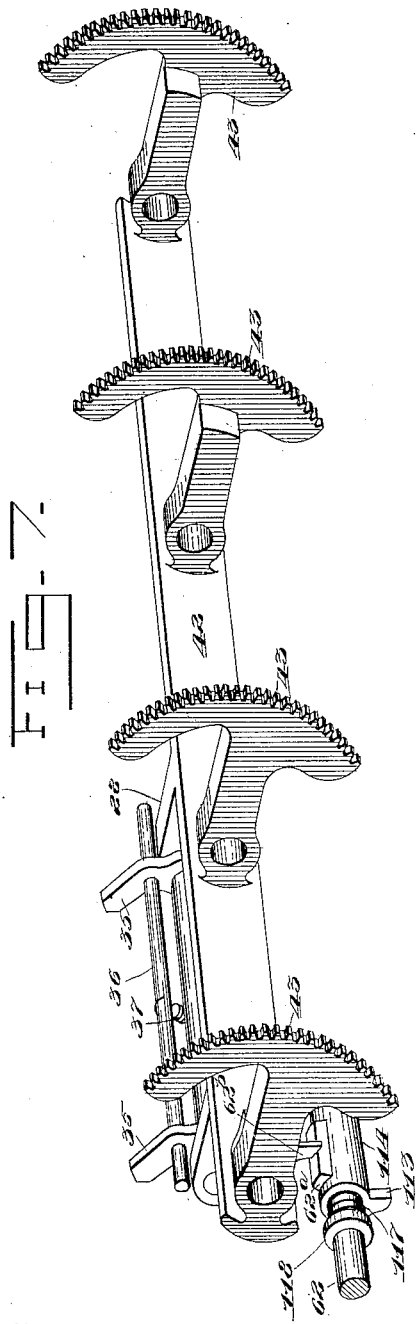
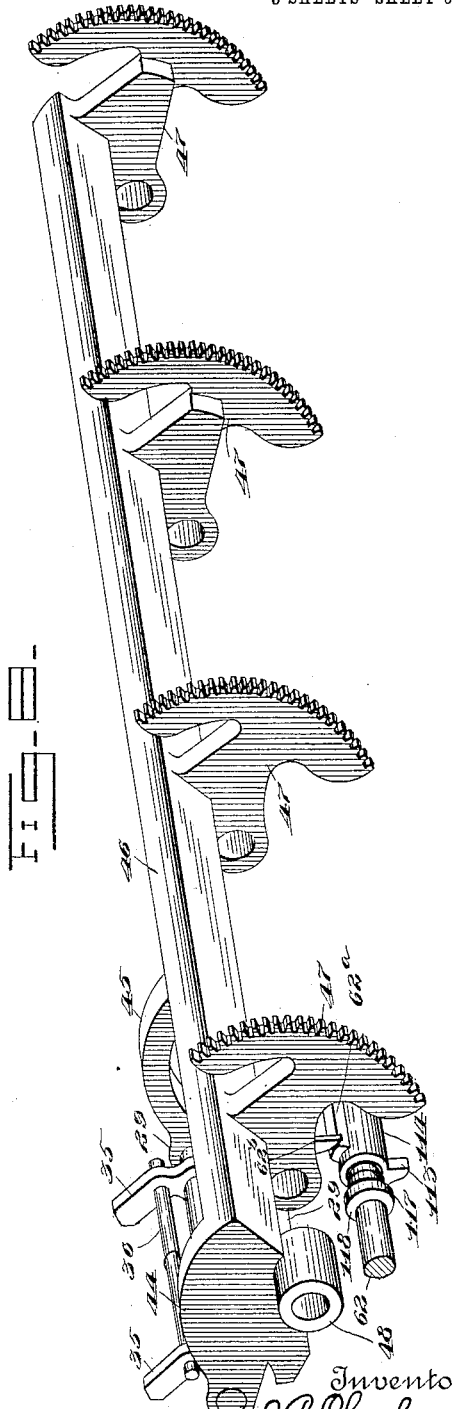
Witnesses
Inventor

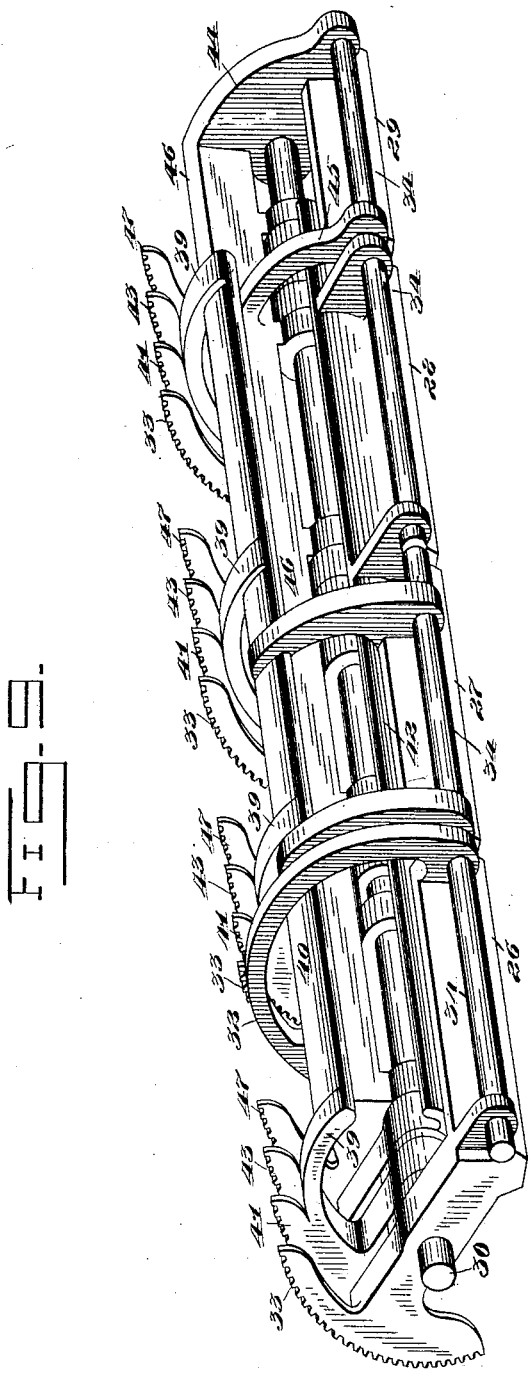

No. 748,261. PATENTED DEC. 29, 1903.
J. P. CLEAL.
CASH REGISTER.
APPLICATION FILED JUNE 15, 1900.
NO MODEL. 8 SHEETS—SHEET 8.
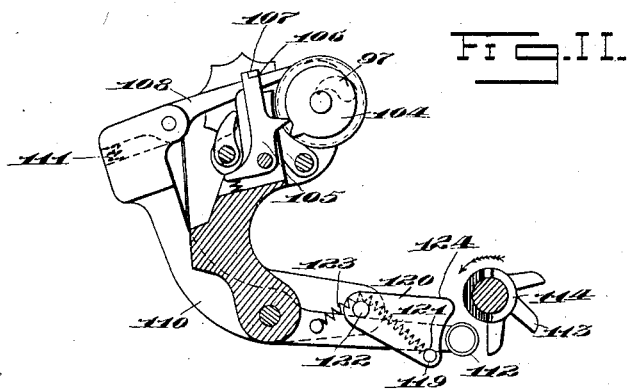
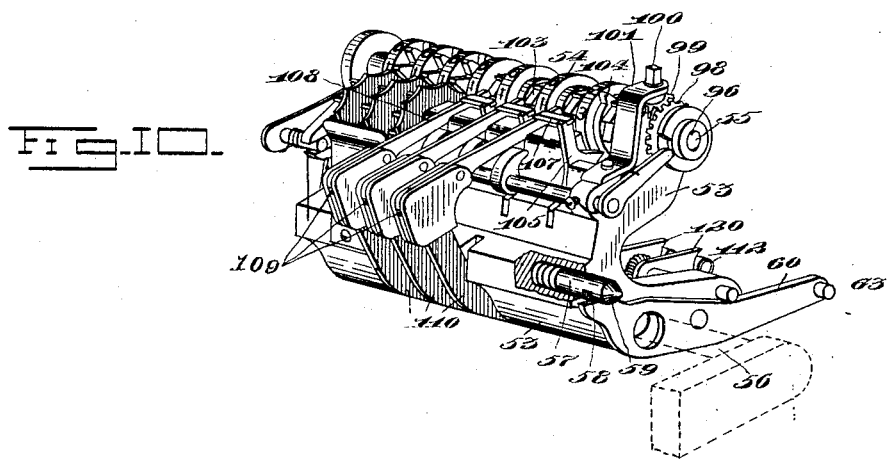
Witnesses
Inventor
Joseph P Cleal
By Alvan Macauley.
Attorney No. 748,261.                                               Patented December 29, 1903.

UNITED STATES PATENT OFFICE.

JOSEPH P. CLEAL, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 748,261, dated December 29, 1903.

Application filed June 15, 1900. Serial No. 20,385. (No model.)

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

My invention relates to improvements in cash-registers. In the drawings I have shown my invention as applied to a machine of the type patented to Thomas Carney, No. 588,127, dated August 17, 1897.

One of the several objects of the invention is to provide an improved machine containing a single operating mechanism and a series of independent counters, any one of which may be brought into coöperative relation with said mechanism at will, whereby a particular transaction or amount may be recorded on any counter desired.

In the appended drawings, forming part of this specification, Figure 1 represents a top plan view of the mechanism embodying my invention applied to a machine of the class mentioned, the cabinet of said machine being removed. Fig. 2 represents a vertical transverse section through said machine on the line $x\ x$ of Fig. 1, the cash-drawer being also omitted. Fig. 3 represents an enlarged detail vertical section on the line $y\ y$ of Fig. 1, a number of the parts being omitted for clearness. Fig. 4 represents a detail perspective view of a portion of the revolution-shaft with two of the sleeves carrying the yielding transfer-operating cams. Figs. 5, 6, 7, and 8 represent, respectively, detail perspective views of a portion of the rotation-shaft and the four yokes or registering-frames carrying the duplicate counter-operating racks. Fig. 9 represents a detail perspective view of the registering-frames assembled, the latches being omitted for clearness. Fig. 10 represents a detail perspective view, partly in section, of one of the counters removed from the main frame. Fig. 11 represents a detail vertical transverse section through said counter, the main rotary shaft, and one of the transfer-cams carried thereby. Fig. 12 represents a detail rear elevation of the key stops or hangers, the rear guide-plate, and the rear ends of the keys. Fig. 13 represents an enlarged detail perspective view of one of the counter-adjusting levers and its operating-frame; and Fig. 14 represents a detail side elevation, partly broken away and partly in section, of one of the counter-frames and its throwing lever and cam.

In the aforesaid drawings, 20 represents the frame of the machine; 21, the operating amount-keys; 22, the indicators; 23, the independent department-counters; 24, the special counter-keys, and $20^a$ the totalizing cash-counter.

As the operating-keys, indicators, and other parts are of substantially the same construction and operation as the machine described in the aforesaid patent, I will refer to such patent for a detail description of these parts, which are well known in the art and need no further detail description in this specification. In general terms, however, the machine comprises a series of pivoted operating-keys or key-levers which when operated elevate suitable vertically-arranged indicators and also actuate graduated lifting bars or plates. These lifting-bars in the patented machine referred to engage a series of pivoted registering-frames mounted side by side on a transverse shaft. The lifting-bars swing the registering-frames according to the value of the operated keys, and thus impart movements to the counter-wheels through suitable segmental racks carried by said frames.

The amount-keys 21 in the present invention carry graduated lifting-bars 25, similar to those of the patented machine, which in the present instance are adapted to engage the cross-rods 34 of a series of registering-frames 26, 27, 28, and 29, which correspond, respectively, to the four banks into which the keys are divided.

The four registering-frames are all pivoted or journaled upon the rock-shaft 30. As the present embodiment of my invention comprises a machine having four totalizing-counters, it is evident that there must be four sets of registering-segments, one for each of said counters. The four sets referred to are shown in Fig. 1 of the drawings, from which it will be seen that there is one units-of-cents registering-segment in each set and that it is the right-hand one. In each set next to the units-of-cents segments and to the left of it is a dimes registering-segment. Next to the latter is the units-of-dollars registering-segment, and the tens-of-dollars segment constitutes the left-hand one of each of said sets. All of the registering-segments of the same denomination are rigidly connected to each other and move simultaneously, so that if a key in the units-of-cents bank be operated all four of the units-of-cents registering-segments will be moved thereby and to an equal extent.

The units-of-cents frame 26 (shown in Figs. 5 and 9) is mounted rigidly upon the rock-shaft 30 by means of a straight arm 31, through which the rock-shaft passes, and the curved arm 32, which at its front end is rigidly secured to the second one of the units-of-cents registering-segments 33. The four gear-toothed segments 33 are all rigidly secured to said rock-shaft, and the latter turns in suitable bearings in the fixed frame 20 of the machine. Said segments are so positioned on said shaft that they will engage the pinions of the units-of-cents counter-wheels of the several counters, as hereinafter more fully described. As shown in Fig. 5, the registering-frame 26 comprises a short transverse bar 34, with which all of the lifting-plates 25 of the units-of-cents bank of keys coöperate to raise it different distances, and thus to lock the frame, according to the value of the key operated. Each of the three other registering-frames comprises a like cross-bar 34, which operates in the same way to transmit the movement of the operated registering-keys to the registering-segments.

The bar 34 supports two pivoted arms 35, connected by a cross-rod 36 and normally drawn rearwardly by a coil-spring 37, which connects said rod to the frame. The arms 35 normally lock under lugs 38, formed on the main frame when the operated keys return to normal position, and thus prevent any vibration of the registering-frames by sudden operation of the keys.

When a key is operated, the rear cam edge 25$^b$ of the lifting-plate in rising engages a cross-bar 25$^a$ of the main frame, and thus forces the lifting-plate forward until striking the rod 36 it in turn forces it forward, and thus disengages the arm 35 from the lugs 38 and frees or releases the frame 26.

The frame 27 (shown in Figs. 6 and 9) is similar to the frame 26, but is mounted loosely upon the shaft 30. It comprises a series of curved arms 39, connected to said frame, a cross-bar 40 rigid with said frame, and racks 41, connected at intervals to said bar and journaled upon the said shaft. The cross-bar 40 passes under the arm 32, as shown in Fig. 9, and said arm may thus operate without hindrance from the adjoining frame.

The racks 41 are so positioned as to coöperate with the pinions of the tens-of-cents counter-wheels of the respective counters.

The frame 28 (shown in Fig. 7 and which coöperates with the units-of-dollars bank of keys) is substantially like the frame 26. It comprises a transverse bar 42, which swings within both the arms 32 and 39, Fig. 9. This bar is supported in position by a series of segmental racks 43, whose arms are fast thereto and journaled on the said shaft 30 in such positions as to coöperate with the pinions of the units-of-dollars counter-wheels of the respective counters.

The frame 29 of the tens-of-dollars bank of keys, as shown in Fig. 8, comprises a segmental plate 44 and a curved arm 45, the latter being so shaped as to allow the bar 42 to swing thereunder. (See Fig. 9.) The said plate and arm 44 and 45 are connected by a cross-bar 46, which in turn is connected to a series of segmental racks 47, journaled on the shaft 30. A hub 48, formed on the plate 44, is also journaled upon the shaft 30. The racks 47 are so positioned as to coöperate with the pinions of the tens-of-dollars counter-wheels.

The peculiar shape of the various registering-frames is due to the fact that it is extremely desirable to nest them, as it were, so that they may operate one within the other in order to economize space. The shafts 34 of all the frames are in alinement and in the path of movement of the lifting-plates 25, so that as a key is depressed the lifting-plate rises, the V-shaped mouth on the front edge thereof contacting with one of the short shafts 34, and thereby rocking the registering-frames which had been previously brought into engagement with one of the counters to properly register the amount.

The elevation of a key-standard of course lifts its respective registering-frame and upon the return movement of the key draws the same downward until it approaches the termination of its stroke, when it disengages from it, leaving said frame to continue its movement by gravity. In order to make the final return movements of the frames positive, I provide each of the end transfer-sleeves 114, hereinafter described, with a lug 62$^a$. (See Figs. 5, 6, 7, and 8.) These lugs are arranged to engage fingers 62$^b$ pendent from the respective rack-segments and are so positioned that this engagement will take place as the final movement of the machine is made, and thus fully move said racks back to their normal positions.

It will be observed from the above description that the relative locations of the respective segmental racks are such that they are grouped in four duplicate series—one for each of the counters 20$^a$ and 23—so that any one of said counters may be thrown into mesh to receive the registration from its respective sets of racks.

Both the amount and the special-transaction keys are of substantially the same construction as described in said patent and coöperate in substantially the same manner with the indicators 22, which construction is well known in the art and needs no further description here.

The rear ends of the amount-keys, as shown in Fig. 12, coöperate with a series of pivoted hangers 50 in the usual manner to prevent the operation of more than one key in the same bank at the same time. As these hangers do not engage the special keys, however, I provide a series of special hangers 51, connected in pairs by link-rods 52. When one of the special keys is operated, the hangers 51 engaging it are moved and, through the links 52, bring all the remaining special hangers into the paths of the special keys to prevent their operation.

Having now described the series of simultaneously-operated racks movable according to the values of the operated keys, I will pass on to the counters which coöperate with said racks, and as these counters are all practically alike a description of one will suffice for all.

In the present embodiment of my invention the three left-hand counters 23 have been appropriated to charge, received-on-account, and paid-out transactions, respectively, while the right-hand counter $20^a$ has been appropriated to cash transactions, and hence is disconnected from operative engagement when any of the other counters is set for operation, as will be hereinafter more fully described.

Each counter comprises a frame 53 and a series of counter-wheels 54, mounted on a shaft 55, which in turn is journaled in said frame. The said frame is pivotally supported in position in the main frame by trunnion-pins 56, which are mounted on said main frame and project into suitable sockets formed in said counter-frame. Each counter-frame is further provided with a spring-pressed plunger 57, (see Fig. 10,) mounted in a socket and formed with a notch 58 and a rounded end 59. A lever 60 is pivoted on each counter-frame and is adapted to engage the plunger 57 and rock the counter-frame forward into engagement with the registering-segments. This operation of the lever is effected by a cam-grooved disk 61, (see Figs. 3 and 14,) mounted on the rotation-shaft 62 of the machine and into which projects a pin 63, mounted on said lever. The latter is formed with a circular opening $60^a$ to accommodate the trunnion 56 and allow free play of the lever independent of the movement of the counter-frame.

When the plungers 57 of the counters 23 are in normal positions, their notches 58 are in alinement with the levers 60, as shown in Fig. 10, so that the operation of the latter will not rock the counters forward into operative position, while the normal position of the plunger 57 of the counter $20^a$ is such that its notch 58 is out of alinement with its lever 60, whereby the operation of said lever will cause it to engage the plunger and force the counter forward into mesh with its respective set of segmental racks.

From the above it follows that when a plunger of one of the counters 23 is in its normal position its respective counter will not be rocked to operative position by its lever 60; but when the plunger is forced into its socket the notch is moved out of alinement with the lever 60, with the result that when the latter is operated it will engage said plunger, and thus rock the counter-frame forward.

The plungers of the counters 23 are set to effect the rocking of their respective counters, as above described, by the operation of their respective special keys 24. The latter are all substantially of the same construction as the regular amount-keys, with the exception that they have no lifting-bars 25.

The extreme left-hand key 24, which controls charge-counter, is provided with a rigid yoke-frame 64, which is journaled on the key-shaft $21^a$ (see Fig. 13) and is provided with a rigid forwardly-extending arm 65, carrying an antifriction-roller 66 at its forward end. This roller projects into a cam-slot 67, formed in a plate 68, which is journaled on a transverse rock-shaft 69, so that when the said special key is depressed and the yoke 64 rocked said plate will be correspondingly operated. The latter is formed with a curved arm or extension 70, (see Fig. 3,) having a beveled end 71, (better shown in Fig. 1,) and which when the arm is moved forward engages the rounded end 59 of its respective plunger 57, and thus forces the same back into its socket, in which position it will be engaged by the lever 60 to rock the counter into operative engagement.

The second special key 24 for the received-on-account transactions is connected to its lever 65 in a similar manner to the above-mentioned key, its connecting-yoke 64 being located above instead of below the shaft $21^a$, as is the first-mentioned yoke. (See Fig. 3.)

The third special key for the paid-out transactions is provided with an antifriction-roller 72, (see Fig. 1,) which extends into the cam-slot 67 of its respective plate 68, and thus operates the latter directly without the intervention of a yoke, as employed in connection with the above-mentioned special keys.

While the levers 68 are loose on the supporting-shaft 69, they are arranged to rock said shaft in the following manner: Each of said levers is provided in proximity to the shaft 69 with a lug 73, which is arranged to strike a similar lug 74, formed on a sleeve 75, fast to said shaft. By means of this peculiar connection the plate 68 may be rocked to operate the shaft 69 without operating any of the remaining levers, so that the different keys 24 upon being operated will rock the shaft 69 to a greater or a less extent, according to the formation of the cam-slots in their respective plates 68 and the movements of said plates.

I have hereinbefore described the connection of all of the special keys with the shaft 69 except the "no-sale" key, which is the extreme right-hand key of the machine. The plate 68ª of this key, as shown in Fig. 2, is fast to the shaft 69, so as to move therewith both upon the operation of its own key and also upon the operation of any of the other special keys. The said no-sale key operates in connection with its lever in substantially the same manner as the paid-out key, with the exception that the cam-slot in its plate 68ª is arranged at a different angle. Further, the extent of movement of the plate 68ª varies according to the particular special key operated, and a graduated movement, Fig. 3, for operating the special printing-wheel 76 (see Fig. 1) is thus secured. The communication between this wheel and the plate 68ª is established through the medium of a sleeve 77, (see Fig. 1,) upon which the wheel is mounted and which is provided with a segmental pinion 78, meshing with a segmental rack 79, formed on said plate, as shown in Fig. 2. By this means the operation of a special key will adjust the printing-wheel 76 to print the proper character designating the character of the transaction and the particular counter in which the registration has been recorded.

The printing mechanism used in connection with this invention may be of any desired construction; but I prefer to use devices substantially as shown and described in the aforesaid patent, in which the printing-wheels are mounted side by side and are connected to the registering-segments by suitable gearing.

In order to return the shaft 69 and all of the plates 68 to normal position after they have been operated, I provide a coiled spring 80, connected at one end to the main frame and at the other to the plate 68ª of the no-sale key, which plate is fast to the shaft 69. When the shaft is rocked, the spring is put under tension to return the parts when they are released.

The movement of the plate 68ª upon the operation of any one of the special keys or the no-sale key results in disconnecting the totalizing-counter, as said plate is formed with a bevel-ended arm 81, which is arranged to force the plunger 57 of the cash-counter into its socket, and thus prevent the counter being thrown forward by its lever 60 by bringing the notch 58 in alinement with said lever.

The rocking of the shaft 69 upon the operation of any one of the special keys also affords means for throwing out the operating mechanism of a special counter 82, which is intended for registering the number of cash sales. (See Fig. 3.) This counter is of any suitable construction and arranged to add one each time it is operated. The arm 83, carrying the operating-pawl 84 of this counter, is provided with an antifriction-roller 85, which projects into a slot 86, formed in a pivoted spring-pressed arm 87, mounted on the usual key-coupler 88, employed in this class of machine and described in the aforesaid patent. By this means it will be observed that upon each reciprocation of the key-coupler one unit will be added to the counter 82. This is true of all transactions except such as are accompanied by the operation of a special key and the consequent rocking of the shaft 69. This shaft carries an arm 89, formed at its rear end with a bevel-edged nose 90. When the shaft is rocked, as above described, upon the operation of a special key this bevel-nose 90 engages the edge of a lever 91 and rocks the same on its trunnions to cause its upper end to engage the arm 87 and force it out of coöperative relation with the roller 85, so that the counter will not be operated upon the movement of the coupler, as aforesaid. The said lever 91 is formed with an aperture 92, through which the key-shaft 21ª projects. Said lever is provided with two trunnion-screws 93, which engage a collar 94, fast to said shaft 21ª, and thus pivotally support the lever. The lower end of the lever 91 is slotted at 95 to receive the shaft 69, which forms a guide therefor.

As it has before been described how the counters are selected and adjusted to be rocked into connection with the counter-operating racks by the cams 61, I will pass on to a description of the counters *per se*. As before stated, each comprises a rock-frame 53, a shaft 55, journaled in said frame, and a series of counter-wheels 54, journaled on said shaft. The latter is formed with a longitudinal groove 96, while each of the wheels 42 carries a spring-pressed pawl 97, (see Fig. 11,) whereby when the shaft is rotated the pawls will be engaged by the walls of the groove, and the counter-wheels thus picked up and returned to the zero position in a manner well-known in the art. The rotation of the shaft to accomplish this result is effected by a beveled pinion 98, fast thereon, and which receives motion from a similar pinion 99, mounted on a short vertical shaft 100. This shaft is journaled in a bracket 101, mounted on the counter-frame, and is squared at its upper end, so that a suitable key may be applied thereto to rotate it.

Each of the first four counter-wheels 54 is provided with a pinion 102, a ratchet-wheel 103, and a transfer-cam disk 104. (See Figs. 1 and 10.) When the counter is rocked, as above described, the pinions 102 are brought into mesh with the segmental counter-operating racks to receive motion from the latter while they are moving in one direction. Before the return movement of the racks is commenced the counter is again rocked back to disengage its pinion from said racks. It will be seen, therefore, that the first four counter-wheels in each counter are operated directly from the segmental counter-operating racks, while the others of higher denomination are operated from the first-mentioned counter-wheels, as hereinafter more fully described.

When one of the first three counter-wheels has made a complete revolution, its transfer-cam disk 104 engages one of a series of spring-pressed tripping-pawls 105 (better shown in Fig. 11) and forces the same back against the tension of its spring to disengage a shoulder 106, formed thereon, from an arm 107, formed on one of a series of transfer-pawls 108, to allow the latter to drop to operative position.

Each of the pawls 108 is pivotally mounted in a slot 109, formed in the upper end of one of a series of operating-levers 110, pivoted in the counter-frame. A coiled spring 111 is interposed between the forward end of the pawl 108 and the bottom of the slot 109, so that the forward end of the pawl is forced downward to engage its respective ratchet 103 when the trip 105 is operated as above described.

When any one of the transfer-levers 110, Figs. 10 and 11, is rocked to effect the transfer, the rear end of the pawl is lifted by the ratchet-wheel, so that the trip-pawl 105 can again pass under the arm 107 and support the transfer-pawl in inoperative position. The transfer-levers are provided at their lower ends with antifriction-rollers 112, which normally project into the paths of cam-arms 113, mounted in successive order of rotation upon the sleeve 114, which in turn is journaled upon the rotation-shaft 62. (See Figs. 4 and 11.) This sleeve is provided with a lug 115, which is normally forced against a stud 116, mounted on the shaft by the tension of a coiled spring 117, also mounted on said shaft and connected to the sleeve and to a collar 118, fast to the shaft. In this manner the transfer-levers 110 are operated successively with a yielding-spring impulse, whereby all shock to the said levers is avoided even though the rotation-shaft be moved very rapidly. The successive operation of the levers 110 is necessary because of the fact that one transfer may move a counter-wheel sufficient to complete its full rotation, which operation would of course call for a transfer to the next adjoining wheel, and this second transfer must take place after the first-mentioned transfer.

Each transfer-lever 110 is normally locked against movement by one of the pins 119, mounted, respectively, on a series of pivoted locking-plates 120 and normally projecting into slight notches 121, formed in said levers. The plates 120 are pivotally mounted upon a transverse shaft 122, mounted in the counter-frame, and are normally drawn up to hold the pins 119 in the notches 121 by coil-springs 123, connecting the pins 119 and the levers 110 and passing over the shaft 122. Each locking-plate is provided with an operating-nose 124, so located as to be engaged and operated by its respective cam-arm 113. It will be observed by reference to the drawings that the cam-arms 113 first strike the projections 124 to operate the pawls 120 and release the levers 110 and then engage the rollers 112 to operate said levers. The devices just described are fully shown and described in the patent to Barnard, No. 570,196, granted October 27, 1896.

The above devices provide only for the transfers between the first four wheels of each counter, any suitable transfer mechanism known to the art being provided for the remaining wheels. As the counters are substantially similar to others now well known in the art, no further detail description of the same is deemed necessary here, as any desired and suitable construction may be employed.

In order to leave a record of the number of times each of the special keys 24 is operated, I provide a series of special counters 125, of any desired form, in which one unit is added thereto upon each operation of its pawl 125. (See Figs. 1 and 2.) These pawls are provided with operating-arms 126ª, which are connected to their respective keys 24 by pivoted links 127, whereby each operation of said keys will add a unit upon its respective counter.

The special keys upon being operated of course become coupled to the key-coupler 88, and thus move with the other keys similarly coupled thereto to make a complete stroke, any suitable and well-known complete-stroke device being employed.

I of course do not wish to limit the application of my invention to counters for receiving the amounts of special transactions, as the same may be employed equally well as department-counters for keeping separate accounts of different classes of goods or to keep the recorded transactions of different clerks separate.

Having thus described my invention, what I claim as new, and desire to secure by Letters Patent, is—

1. In a cash-register, the combination with an operating mechanism, and a series of amount-keys, of a series of special keys, a series of special counters for said special keys, a normally engaged special counter arranged to register each operation of the amount-key, and means connected to the special keys for disengaging this last-mentioned counter when any special key is operated.

2. In a cash-register, the combination with duplicate operating devices, of a series of independent counters arranged to be moved into connection therewith, throwing devices for said counters, a series of pivoted levers having wedge ends for setting the respective throwing devices, and a series of special keys for operating said levers.

3. In a cash-register, the combination with duplicate operating devices, of a series of independent counters arranged to be moved into connection with the same, throwing-levers for said counters, movable plungers mounted on said counters and coacting with said levers, a series of pivoted plates or levers arranged to move the respective plungers, and a series of special keys for operating said pivoted plates.

4. In a cash-register, the combination with duplicate operating devices, of a series of independent counters, pivoted levers for throwing said counters, notched spring-pressed plungers mounted on said counters and coöperating with said levers, pivoted plates or levers having wedge ends for moving said plungers and a series of special keys for operating said plates.

5. In a cash-register, the combination with duplicate operating devices, of a series of independent counters, pivoted plates or levers having cam-slots and arranged to set said counters for operation and a series of special keys having projections which coöperate with the cam-slots of said levers.

6. In a cash-register, the combination with an operating mechanism, of a series of special keys, a rock-shaft, means connecting said keys and shaft, a special counter, a pivoted lever arranged to be operated by said shaft and a counter-operating arm arranged to be thrown out of operative position by said lever.

7. In a cash-register, the combination with an operating mechanism, of a series of special keys, a rock-shaft having a series of lugs, a series of levers loosely mounted on said shaft and having lugs which coact with the lugs on said shaft to move said shaft different distances according to the key operated, and a printing device connected to said shaft.

8. In a cash-register, the combination with an operating mechanism, of a series of special keys, a shaft, a series of levers loosely mounted upon said shaft but arranged to rock the same upon being operated by said special keys, a series of counters arranged to be set for operation by said levers and a counter arranged to be rendered inoperative upon the rocking of the shaft.

9. In a cash-register, the combination with an operating mechanism, of a series of special keys, a shaft, a series of independent counters, throwing devices for said counters, a series of levers loosely mounted on said shaft and arranged to set said throwing devices, means for moving the shaft when the levers are operated by said special keys, and a counter arranged to be rendered inoperative upon the movement of the shaft.

10. In a cash-register, the combination with an operating mechanism, of a series of special keys, a shaft, a series of levers mounted upon said shaft and arranged to be operated by said keys, a series of counters arranged to be set for operation by said levers, a counter for adding one upon each regular operation of the machine, means for operating the shaft by said levers, and devices for throwing out the last-mentioned counter upon the operation of the shaft.

11. In a cash-register, the combination of an operating mechanism, of a series of special keys, a rock-shaft, means operated by the keys for moving said shaft, a counter for adding one upon each regular operation of the machine, a movable arm connecting said counter to the operating mechanism, and means connected to said shaft for moving said arm out of operative position.

12. In a cash-register, the combination with an operating mechanism, of a series of independent counters arranged to be moved into connection with the same, throwing devices for said counters, movable plungers mounted on said counters, and coacting with said throwing devices, a series of pivoted levers arranged to set the respective levers and a series of special keys for operating said plungers.

13. In a cash-register, the combination with an operating mechanism, of a series of independent counters mounted on rock-frames so as to be capable of being moved into connection with said mechanism, throwing means for said counters, setting devices mounted on the counters and coöperating with said means, pivoted levers for operating the setting devices and special keys for operating said levers.

14. In a cash-register, the combination with an operating mechanism, of a series of independent counters arranged to be moved into connection with the same, throwing-levers for said counters, movable plungers mounted on said counters and coacting with said levers, a series of pivoted levers having beveled ends which engage said plungers, and a series of special keys for operating the respective bevel-ended levers.

15. In a cash-register, the combination with an operating mechanism, of a counter arranged to count one each time it is operated, a pivoted spring-pressed lever arranged to operate the counter upon each regular operation of the register, a pivoted lever for throwing the spring-pressed lever into and out of operative position, a rock-shaft having an arm arranged to operate said pivoted lever, and a series of special keys arranged to rock said shaft.

16. In a cash-register, the combination with an operating mechanism, of a rock-shaft, a series of levers loose on said shaft but arranged to move the same different distances, a lever fast to said shaft and carrying a rack, a printer carrying a pinion meshing with said rack, and a series of special keys for operating the respective levers.

17. In a cash-register, the combination with an operating mechanism, of a rock-shaft, a series of levers loose on said shaft but arranged to move the same different distances when operated, a lever fast to said shaft, a printer connected to this latter lever, and a series of special keys for operating the respective levers.

18. In a cash-register, the combination with an operating mechanism, of a series of independent counters arranged to be moved into connection with the same, movable plungers mounted in said counters and arranged to be set for throwing their respective counters into connection with the operating mechanism, a series of pivoted levers arranged to move the respective plungers, and a series of keys for operating said levers.

19. In a cash-register, the combination with an operating mechanism, of a series of independent counters any one of which may be brought into connection with said mechanism, independent means for setting said counters to be thrown into such connection, a special counter arranged to add one unit upon each regular operation of the machine, and devices operated by the setting means for throwing out this last-mentioned counter.

20. In a cash-register, the combination with a series of amount-keys, of an operating mechanism, a series of independent counters arranged to be operated to add the amounts of the said keys, special keys for controlling said counters, a counter arranged to add one unit upon each regular operation of the machine, and means for rendering this last counter inoperative when any one of the special keys is actuated.

21. In a cash-register, the combination with an operating mechanism, of a series of independent counters, movable plungers mounted on said counters, counter-throwing devices coöperating with said plungers, a series of independent levers for operating said plungers, a member common to and arranged to be moved by any one of said levers.

22. In a cash-register, the combination with an operating mechanism, of a series of independent counters, a series of independent levers, setting devices mounted on said counters and arranged to be operated by said levers, a series of keys for operating said levers, a member common to and arranged to be operated by said levers, and a printing mechanism connected to said member.

23. In a cash-register, the combination with an operating mechanism, of a series of independent counters, independent levers for setting said counters for operation in connection with the operating mechanism, a series of keys for operating said levers, a member common to said levers and arranged to be moved different distances by the same and a printing mechanism connected to said member.

24. In a cash-register, the combination with an operating mechanism, of a series of independent counters, a shaft, a series of counter-adjusting levers loosely mounted on said shaft, means intermediate the levers and shaft, whereby the operation of one lever will move the shaft without moving the remaining levers, a series of special devices for operating said levers, and a printing device connected to said shaft.

25. In a cash-register, the combination with an operating mechanism, of a series of independent counters, levers disconnected from said counters and arranged to be moved to predetermine which counter shall be operated, and a series of special keys having projections arranged to engage and move said levers into operative position upon the depressing of said keys.

26. In a cash-register including a series of amount-keys and a series of special keys, a counter arranged to have one unit added thereto upon each operation of the machine which does not include the operation of one of the special keys.

27. In a cash-register, the combination with a series of amount-keys, of a series of special keys, a series of independent counters arranged to be brought by the respective special keys into coöperative relation with the amount-keys, and a counter arranged to have one unit added thereto upon each operation of the machine which does not include the operation of one of the special keys.

28. In a cash-register, the combination with a series of amount-keys, of a series of special keys, a main counter arranged to be normally operated by said keys, a series of independent counters arranged to be controlled by the respective special keys, means for throwing out the main counter when any one of the special keys is operated, and a counter arranged to have one unit added thereto upon each operation of the main counter.

29. In a cash-register, the combination with an operating mechanism, of a series of independent department-counters, a series of independent devices for controlling said counters, a rock-shaft arranged to be moved by the operation of any one of said devices, a counter arranged to add one unit upon each regular operation of the machine and means arranged to be operated by the shaft to throw out this last-mentioned counter.

30. In a cash-register, the combination with an operating mechanism, of a series of independent department-counters, a series of special keys for setting the department-counters for operation, special counters for the respective keys arranged to add one unit upon the operation of their respective keys, a counter arranged to add one unit upon each regular operation of the machine and devices for throwing out the last-mentioned counter, when any one of the special keys is operated.

31. In a cash-register, the combination with an operating mechanism, of a counter normally set for coöperation with the same, a series of special keys, a rock-shaft arranged to be moved different distances by said keys, a lever fast on said shaft and carrying a rack, devices coöperating with the lever for preventing the operation of the counter, and a printing device carrying a pinion which meshes with said rack.

32. In a cash-register the combination with an operating mechanism, of a series of independent department-counters, a regular counter, a counter for counting the number of times the regular counter is operated and means for bringing any department-counter into operative position arranged to throw out both the regular counter and the counter for counting the number of times the regular counter is operated.

33. In a cash-register the combination with a totalizing-counter, of a counter for counting the number of times the totalizing-counter is operated, means for throwing out the totalizing-counter arranged to also disconnect the remaining counter.

34. In a cash-register the combination with an operating mechanism, of a counter mounted in a movable frame and arranged to be thrown into and out of connection with the operating mechanism, a special counter for counting the number of times the regular counter is operated, means for throwing the counter-frame and devices for adjusting the throwing means so that the frame will remain stationary, said devices also rendering the special counter inoperative.

35. In a cash-register the combination with an operating mechanism, of a plurality of counters, one of which is normally operated, devices for rendering any one of the counters operative and the regular counter inoperative and a special counter for the regular counter also rendered inoperative by said devices.

36. In a cash-register the combination with an operating mechanism of a plurality of special counters and a regular counter all mounted in independent rocking frames, adjustable throwing devices on the respective frames, independent means for adjusting the throwing devices of the special counter-frames, said means also adjusting the regular counter-throwing devices.

37. In a cash-register, the combination with a series of operating amount-keys, of a series of special keys, a special counter adapted to register the regular operations of the amount-keys, means for actuating said counter, and means for disabling said counter-actuating means whenever a special key is operated.

38. In a cash-register, the combination with a series of amount-keys, and a key-coupler; of a special counter, a counter-actuating device carried by the key-coupler for operating the special counter, a series of special keys, and means connected with the latter to disable the said counter-actuating device.

39. In a cash-register, the combination with an operating mechanism, of a series of special keys, a printer-wheel bearing characters corresponding to the special keys, an oscillating frame fixedly connected with one of the special keys and geared to said printer-wheel, oscillating frames for the other special keys, and means connecting the latter frames with the printer-actuating frame with provisions for differential lost motion to cause the latter to be actuated graduated distances.

40. In a cash-register, the combination with an operating mechanism, of a plurality of independent counters one only of which is normally operative, a series of special keys with provisions for controlling the normally inoperative counters, a special printer-wheel, and means actuated by said special keys for disabling the normally operative counter and setting the special printer-wheel.

41. In a cash-register, the combination with a series of operating amount-keys and a key-coupler, of a plurality of independent counters, and a series of special keys engaging with the key-coupler so as to operate simultaneously with said amount-keys and arranged to predetermine which counter shall be operated.

In testimony whereof I affix my signature in the presence of two witnesses.

JOSEPH P. CLEAL.

Witnesses:
WILLIAM H. MUZZY,
IRA BERKSTRESSER.